United States Patent
Wilkey

(10) Patent No.: US 6,207,795 B1
(45) Date of Patent: Mar. 27, 2001

(54) REMOVAL OF HYDROGENATION CATALYST FROM POLYMER SOLUTIONS BY TREATMENT WITH AMMONIA AND CARBON DIOXIDE

(75) Inventor: John David Wilkey, Evansville, IN (US)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 09/371,303

(22) Filed: Aug. 10, 1999

Related U.S. Application Data

(60) Provisional application No. 60/098,400, filed on Aug. 31, 1998.

(51) Int. Cl.[7] ........................................... C08G 6/00
(52) U.S. Cl. ........................................................ 528/482
(58) Field of Search ................................ 528/480, 482

(56) References Cited

U.S. PATENT DOCUMENTS

| | | | |
|---|---|---|---|
| H1303 | 4/1994 | Miller et al. | 528/495 |
| 3,531,448 | 9/1970 | Johnson | 260/85.1 |
| 3,780,138 | 12/1973 | Hassell et al. | |
| 4,028,485 | 6/1977 | Poloso et al. | 528/486 |
| 4,098,991 | 7/1978 | Kang | 528/492 |
| 4,278,506 | 7/1981 | Irvin | 203/68 |
| 4,471,099 | 9/1984 | Trepka | 525/338 |
| 4,595,749 | 6/1986 | Hoxmeier | 528/483 |
| 4,927,794 | 5/1990 | Marcantonio | 502/26 |
| 4,952,304 | 8/1990 | Timms | 208/251 R |
| 5,212,285 | 5/1993 | Diaz et al. | 528/482 |
| 5,281,696 | 1/1994 | Gibler | 528/485 |
| 5,288,937 | 2/1994 | Colbaugh et al. | 585/507 |

FOREIGN PATENT DOCUMENTS 0312213   4/1989   (EP) .

*Primary Examiner*—Terressa M. Boykin
(74) *Attorney, Agent, or Firm*—Donald F. Haas

(57) ABSTRACT

This invention is a process comprising the steps of contacting a Group VIII metal hydrogenation catalyst residue-containing polymer solution with an aqueous solution of ammonia and carbon dioxide, separating the residue from the solution, and recovering a polymer solution preferably comprising less than 15 ppm by weight based on polymer, of the Group VIII metal. The concentration of the ammonia in the aqueous solution is from 2 to 7% by weight, preferably 3 to 6% by weight. The concentration of the carbon dioxide in the solution is from 1 to 7% by weight, preferably 2 to 6% by weight.

17 Claims, No Drawings

REMOVAL OF HYDROGENATION CATALYST FROM POLYMER SOLUTIONS BY TREATMENT WITH AMMONIA AND CARBON DIOXIDE

This application claims the benefit of U.S. Provisional Application Ser. No. 60/098,400, filed Aug. 31, 1998, the entire disclosure of which is hereby incorporated by reference

FIELD OF THE INVENTION

This invention relates to a process to prepare hydrogenated polymers. More particularly, the invention relates to the removal of residues of hydrogenation catalysts from polymer solutions.

BACKGROUND OF THE INVENTION

The uses of polymeric materials, including diolefin polymers, continue to grow rapidly in such diverse areas as protective paint coverings, wire insulations, structural panels for automobiles, piping and lubricating oil viscosity index improvers. In many of these applications, the stability of the polymer is of paramount importance. Hydrogenation of diolefin polymers greatly improves the stability of these polymers against oxidative, thermal, and ultraviolet degradation. Polymer hydrogenation processes have therefore been studied for many years as a method to prepare novel materials with excellent stability and other desirable properties. Early polymer hydrogenation processes utilized heterogeneous catalysts which were known to be useful for hydrogenation of low molecular weight olefins and aromatics. These catalyst systems included catalysts such as nickel on kieselguhr. A fine catalyst powder was preferred and large amounts of catalysts were required to complete the hydrogenation in a reasonable time. Such processes were only partially successful, since the reaction requires the diffusion of the polymer molecules into the pores of the catalyst, where the active nickel metal is present. This is a slow process when hydrogenating polymers.

Discovery of nickel 2-ethyl-1-hexanoate/triethyl aluminum hydrogenation catalyst systems enabled rapid hydrogenation of polymers. These processes utilize the catalyst as a colloidal suspension in polymer containing solutions. This type of catalyst is referred to as a homogeneous catalyst. Such a process has been used for a number of years to prepare hydrogenated isoprene-styrene block copolymers that are used as viscosity index improvers in premium motor oils. U.S. Pat. No. 3,554,991 describes an exemplary process. Besides nickel, Group VIII metals in general will function as the active metal in these systems, and in particular, iron, cobalt, and palladium are known to be acceptable.

Pore diffusion is not a limitation when homogeneous catalysts are utilized. The hydrogenation process is rapid and complete in a matter of minutes. However, removal of the catalyst from the polymer product is necessary because metals, particularly nickel, which remain with the polymer catalyze degradation of the polymer product. The removal of the catalyst from the polymer solution is commonly accomplished by the addition of an acidic aqueous solution and air to oxidize the nickel to a divalent state. The nickel and aluminum salts are soluble in the aqueous phase and can then be removed from the hydrogenated polymer solution by separation of the aqueous phase.

Alternative methods to remove hydrogenation catalyst residues from solutions of hydrogenated polymers include treatment with dicarboxylic acid and an oxidant, as disclosed in U.S. Pat. No. 4,595,749; treatment with an amine compound wherein the amine is either a chloride salt or a diamine having an alkyl group of 1 to 12 carbon atoms as disclosed by U.S. Pat. No. 4,098,991; and treatment with a non-aqueous acid followed by neutralization with an anhydrous base and filtration, as disclosed by U.S. Pat. No. 4,028,485. These processes involve contacting the polymer solution with compounds which contaminate the polymer. Further process steps can be required to remove these contaminants. U.S. Pat. Nos. 4,278,506 and 4,471,099 describe processes to remove such contaminants from hydrogenated polymer solutions. Some of these catalyst removal systems are undesirable because the processes require relatively expensive metallurgy due to the corrosive nature of the compounds. Many also require the consumption of a continuous stream of reactants and produce sludge containing the catalyst and residues of the treatment chemicals.

The above-described processes for removing catalyst residue had the disadvantage that they leave behind acid salts and other residual catalyst components. These materials must be removed from the polymer and normally this involves multiple stage water washing. Such water washing can be quite expensive in terms of capital investment and time. Thus, there is a need for a method of removing hydrogenation catalyst which minimizes the amount of residual material left in the polymer but which also allows the extraction solution to be recycled. The present invention provides such a process.

SUMMARY OF THE INVENTION

This invention is a process comprising the steps of contacting a Group VIII metal hydrogenation catalyst residue-containing polymer solution with an aqueous solution of ammonia and carbon dioxide, separating the residue from the solution, and recovering a polymer solution preferably comprising less than 15 ppm by weight, based on polymer, of the Group VIII metal. The concentration of the ammonia in the aqueous solution is from 2 to 7% by weight, preferably 3 to 6% by weight. The concentration of the carbon dioxide in the solution is from 1 to 7% by weight, preferably 2 to 6% by weight.

DETAILED DESCRIPTION OF THE INVENTION

The polymer solutions of the present invention preferably comprise from 1 to about 50 percent by weight of a polymer, and more preferably comprise from about 5 to about 40 percent by weight of polymer based on the total amount of solution. The polymer is a partially, selectively, or totally hydrogenated polymer. The present invention does not depend upon the type of nature of the polymer. The polymer may therefore be a thermoplastic polymer, or an elastomeric polymer and may have a molecular weight which varies between wide limits. Most typically, polymers which are benefited by hydrogenation are those comprising polymerized conjugated diolefins. These conjugated diolefin containing polymers are therefore preferred for the practice of the present invention. They may be prepared by radical, anionic or cationic polymerization and may be copolymers with other monomer units. The copolymers may be random, block, or tapered, and may have structures that are linear, branched, radial or star.

In a most preferred embodiment, the polymer is an anionically polymerized conjugated diolefin polymer which was anionically polymerized in an inert solvent and then hydrogenated in the same solvent to form the hydrogenation catalyst residue containing polymer solution. The preferred polymers in this invention are block copolymers of styrene and a conjugated diene, especially butadiene or isoprene.

When an anionic initiator is used, polymers will be prepared by contacting the monomers with an organoalkali metal compound in a suitable solvent at a temperature within the range from about −100° C. to about 300° C., preferably at a temperature within the range from about 0° C. to about 100° C. Particularly effective polymerization initiators are organolithium compounds having the general formula:

$$RLi_n$$

wherein:
R is an aliphatic, cycloaliphatic or aromatic hydrocarbon radical having from one to about 20 carbon atoms; and n is an integer from 1 to 4.

The polymer of the present invention is contacted with hydrogenation catalyst and hydrogen in a solution with an inert solvent such as cyclohexane, normal hexane, diethyl ether, toluene or benzene. The hydrogenation catalysts themselves have complex structures which are not well understood and are therefore usually described by the process used to prepare them. The hydrogenation catalyst can be prepared by combining a Group VIII metal carboxylate or alkoxide ("catalyst") with an alkyl or hydride of a metal selected from Groups I-A, II-A and III-B of Medeleev's Periodic Table of Elements ("cocatalyst"). The preparation of such catalysts is taught in U.S. Pat. Nos. 3,591,064 and 4,028,485, which are incorporated herein by reference.

The catalyst metals which are preferred include iron, cobalt, nickel and palladium. Nickel and cobalt are particularly preferred. Aluminum is the preferred cocatalyst metal due to the excellent activity of the resulting cocatalyst.

The hydrogenation catalyst is extracted from the polymer cement following hydrogenation using an aqueous solution of ammonia and carbon dioxide. The aqueous solution is comprised of from 2 to 7% by weight of ammonia, preferably 3 to 6% by weight, and 1 to 7% by weight of carbon dioxide, preferably 2 to 6% by weight. In a preferred embodiment, air or oxygen is added to oxidize the metal, i.e., nickel to a divalent state. The hydrogenation catalyst residue-containing polymer solution is contacted with this aqueous solution either in a continuous process or in a batch process. The contact is preferably carried out by reacting in a stirred reactor or in an in-line mixer. The extraction can be carried out at a temperature of from 20 to 100° C. and an aqueous solution to polymer cement phase ratio of from 0.1 to 1.0 for a period of time from 1 to 60 minutes. The polymer concentration of cement can range from 1 to 50% by weight.

The extraction is completed by allowing the phases to separate. If the phases do not immediately separate, a phase separation agent such as isopropyl alcohol or 2-ethylhexanol is added to induce separation. The aqueous phase containing the extracted hydrogenation catalyst residue is removed by decantation, centrifugation, or other separation processes.

Excess ammonia and carbon dioxide remaining in the polymer cement will be volatized during the finishing of the polymer subsequent to the extraction step. The spent extraction solution can be recycled. Devolatilization of excess ammonia and carbon dioxide from the spent extraction solution generates only water insoluble species (nickel carbonate, aluminum hydroxide and lithium carbonate, for example) which can be captured by filtration, centrifugation or other separation processes. The recovered water can be made up with recovered or fresh ammonia and carbon dioxide and reused.

EXAMPLES

The extractions were performed in a baffled 5-liter extraction vessel with a height to diameter ratio of 2.2:1. Mixing was provided via a shaft fitted with two 2.5'-diameter flat-blade turbine mixers rotating at a tip speed of 1400 ft/min. Each batch extraction was carried out at a constant volume of 3.5 liters. The polymer solutions consisted of a hydrogenated styrene-butadiene-styrene block copolymer with number-average molecular weight of 190,000 g/mole, of which about 30% by weight is styrene, dissolved in cyclohexane at a concentration of 14% by weight. The solutions contained varying quantities of nickel hydrogenation catalyst as indicated in Table 1. Nickel levels were determined by atomic absorption spectroscopy.

Example 1

The extraction vessel was charged with 2.0 kg of polymer solution, containing 315 ppm nickel on a dry polymer basis. Next, 1.0 kg of a distilled water solution containing 5 wt % ammonia and 6 wt % carbon dioxide was charged to the vessel and the contents were heated to 50° C. The mixture was stirred for 15 minutes, while a dilute stream of oxygen in nitrogen was bubbled through the reactor contents. The mixer was stopped and the phases were allowed to settle for 40 minutes. The organic phase was sampled, analyzed and determined to contain 25 ppm nickel on a dry polymer basis. Following centrifugation to remove any remaining aqueous phase, the polymer solution was determined to contain 6 ppm unextracted nickel on a dry polymer basis.

Example 2

Example 1 was repeated except for the conditions listed in Table 1.

Example 3

Example 1 was repeated except for the conditions listed in Table 1, and the polymer content was 13 wt % in cyclohexane.

Example 4

Example 1 was repeated except for the conditions listed in Table 1. The two phases did not separate after mixing was stopped; 50 milliliters of isopropyl alcohol was added to the reactor contents to induce separation.

Comparative Example 1

Example 1 was repeated except the aqueous solution contained no dissolved carbon dioxide. Table 1 indicates the extraction performance was inferior when compared with Examples 1 through 4.

| Ex. | ammonia wt % | carbon dioxide wt % | Temp. ° C. | Phase ratio wt aq/wt org | Mix time min. | Init. nickel, polymer basis ppm | Final nickel, polymer basis ppm centrifuged |
|---|---|---|---|---|---|---|---|
| Ex.1 | 5 | 6 | 50 | 0.5 | 15 | 315 | 6 |
| 2 | 5 | 3 | 80 | 0.5 | 45 | 325 | 9 |
| 3 | 5 | 2 | 70 | 0.5 | 30 | 328 | 32 |
| 4 | 2.3 | 3 | 70 | 0.4 | 15 | 339 | 11 |
| Comp. Ex. 1 | 4 | 0 | 70 | 0.6 | 25 | 380 | 160 |

It can be seen that the Examples of the present invention, 1–4, achieve a dramatic decrease in the amount of nickel in the polymer cement. The worst of these decreased the nickel level to 10% and the best to about 2%. The Comparative Example which did not utilize carbon dioxide removed less than two thirds of the residual nickel in the polymer cement.

I claim:

1. A process for removing Group VIII metal hydrogenation catalyst residue from a polymer, comprising:

reacting a polymer cement comprising a Group VIII metal hydrogenation catalyst residue with an aqueous solution of ammonia and carbon dioxide;

separating the polymer cement and Group VIII metal into phases; and recovering the polymer cement.

2. The process of claim 1 wherein the concentration of the ammonia in the aqueous solution is from 2 to 7% by weight and the concentration of the carbon dioxide in the aqueous solution is from 1 to 7% by weight.

3. The process of claim 1 wherein the concentration of the ammonia in the aqueous solution is from 3 to 6% by weight and the concentration of the carbon dioxide in the aqueous solution is from 2 to 6% by weight.

4. The process of claim 1, wherein the polymer cement comprises a block copolymer of styrene and a conjugated diene.

5. The process of claim 4, wherein the conjugated diene is butadiene or isoprene.

6. The process of claim 1 wherein the Group VIII metal hydrogenation catalyst residue is selected from the group consisting of iron, cobalt, nickel, and palladium.

7. The process of claim 1 wherein a weight ratio of the aqueous solution to the polymer cement is about 0.1 to 1.0.

8. A process for removing hydrogenation catalyst residue from a polymer cement, comprising:

mixing an aqueous solution comprising ammonia and carbon dioxide with a polymer cement comprising hydrogenation catalyst residues;

separating the aqueous solution and the polymer cement; and recovering the polymer cement.

9. The process of claim 8 wherein the concentration of the ammonia in the aqueous solution is from 2 to 7% by weight and the concentration of the carbon dioxide in the aqueous solution is from 1 to 7% by weight.

10. The process of claim 8 wherein a weight ratio of the aqueous solution to the polymer cement is about 0.1 to 1.0.

11. The process of claim 8 wherein the hydrogenation catalyst residue comprises a Group VIII metal selected from the group consisting of iron, cobalt, nickel, and palladium.

12. A process for removing Group VIII metal residue from a hydrogenated polymer cement, comprising:

polymerizing a monomer selected from the group consisting of conjugated alkadienes, monoalkenyl-substituted aromatic compounds, and mixtures thereof with an alkali-metal to form a polymer cement comprising alkali metal terminated polymer;

hydrogenating the polymer cement with a Group VIII metal hydrogenation catalyst to form a hydrogenated polymer cement having Group VIII metal residues;

adding an aqueous solution comprising ammonia and carbon dioxide to the hydrogenated polymer cement; and recovering the hydrogenated polymer cement.

13. The process of claim 12, wherein the hydrogenated polymer cement comprises a block copolymer having at least two endblocks of polymerized monovinyl aromatic compound and a midblock of polymerized conjugated diene.

14. The process of claim 13, wherein the polymerized conjugated diene is selected from polymerized butadiene and polymerized isoprene.

15. The process according to claim 12, wherein the hydrogenation catalyst comprises nickel and aluminum.

16. The process of claim 12, wherein a weight ratio of the aqueous solution to the polymer cement is about 0.1 to 1.0.

17. The process of claim 12 wherein the concentration of the ammonia in the aqueous solution is from 2 to 7% by weight and the concentration of the carbon dioxide in the aqueous solution is from 1 to 7% by weight.

* * * * *